US007676159B2

(12) United States Patent
Wai et al.

(10) Patent No.: US 7,676,159 B2
(45) Date of Patent: Mar. 9, 2010

(54) ALL-OPTICAL HEADER PROCESSING AND PACKET SWITCHING

(75) Inventors: Alexander Ping-Kong Wai, Kowloon (HK); Lixin Xu, Kowloon (HK); Lai Yin Chan, Kowloon (HK); Luen Fu Lui, Kowloon (HK); Hwa Yaw Tam, Kowloon (HK)

(73) Assignee: The Hong Kong Polytechnic University, Hong Kong (CN)

( * ) Notice: Subject to any disclaimer, the term of this patent is extended or adjusted under 35 U.S.C. 154(b) by 1046 days.

(21) Appl. No.: 11/126,401

(22) Filed: May 11, 2005

(65) Prior Publication Data

US 2006/0257144 A1    Nov. 16, 2006

(51) Int. Cl.
*H04B 10/02* (2006.01)
*H04J 14/02* (2006.01)
(52) U.S. Cl. .................. 398/166; 398/31; 398/201; 398/45
(58) Field of Classification Search .............. 398/201, 398/166, 31, 45
See application file for complete search history.

(56) References Cited

U.S. PATENT DOCUMENTS

| 5,488,501 | A  | * | 1/1996 | Barnsley | 398/51 |
|---|---|---|---|---|---|
| 2004/0081464 | A1 | * | 4/2004 | Watanabe | 398/99 |
| 2007/0086780 | A1 | * | 4/2007 | Islam | 398/45 |
| 2007/0098404 | A1 | * | 5/2007 | Wada et al. | 398/57 |

OTHER PUBLICATIONS

Chan et al, "Architectures and Technologies for High-Speed Optical Data Networks" *Journal Of Lightwave Technology* (Dec. 1998) 16(12):2146-2168.
Rodriguez-Moral et al, "Optical Data Networking: Protocols, Technologies, and Architectures for Next Generation Optical Transport Networks and Optical Internetworks" *Journal Of Lightwave Technology* (Dec. 2000) 18(12):1855-1870.
Papadimitriou et al, "Optical Switching: Switch Fabrics, Techniques, and Architectures" *Journal Of Lightwave Technology* (Feb. 2003) 21(2):384-405.
Bregni et al, "Architectures and Performance of AWG-Based Optical Switching Nodes for IP Networks" *IEEE Journal on Selected Areas in Communications* (Sep. 2003) 21(7):1113-1121.
Varrazza et al, "Active Vertical-Coupler-Based Optical Crosspoint Switch Matrix for Optical Packet-Switching Applications" *Journal of Lightwave Technology* (Sep. 2004) 22(9):2034-2042.
Qiao et al, "Optical burst switching (OBS)—a new paradigm for an Optical Internet[1]" *Journal of High Speed Networks* 8 (May 1999) 69-84.
Xue et al, "High-Capacity Multiservice Optical Label Switching for the Next-Generation Internet" *IEEE Optical Communications* (May 2004) pp. S16-S22.

(Continued)

*Primary Examiner*—Leslie Pascal
(74) *Attorney, Agent, or Firm*—Jacobson Holman PLLC

(57) ABSTRACT

A process for all-optically switching an incoming optical signal having at least a data packet is provided. The data packet including at least an address bit in its header, and the process includes receiving the data packet; processing the header optically; storing the decision made during the processing of the header; and switching the whole incoming data packet dependent upon the decision.

30 Claims, 7 Drawing Sheets

OTHER PUBLICATIONS

Gambini et al, "Transparent Optical Packet Switching: Network Architecture and Demonstrators in the KEOPS Project" *IEEE Journal on Selected Areas in Communications* (Sep. 1998) 16(7):1245-1259.

Banerjee et al, "Generalized Multiprotocol Label Switching: An Overview of SignalingEnhancements and Recovery Techniques" *IEEE Communications Magazine* (Jul. 2001) pp. 144-151.

Dittmann et al, "The European IST Project DAVID: A Viable Approach Toward Optical Packet Switching" *IEEE Journal on Selected Areas in Communications* (Sep. 2003) 21(7):1026-1040.

Blumenthal et al, "Photonic Packet Switches: Architectures and Experimental Implementations" *Proc. Of The IEEE* (Nov. 1994) 82(11):1650-1667.

Sokoloff et al, "A Terahertz Optical Asymmetric Demultiplexer (TOAD)" *IEEE Photonics Tech. Letters* (Jul. 1993) 5(7):787-790.

Glesk et al, "All-Optical Address Recognition And Self-Routing in a 250Fbit/s packet-switched network" *Electronics Letters* (Aug. 4, 1994) 30(16):1322-1323.

Glesk et al, "Demonstration of ultrafast all-optical packet routing" *Electronics Letters* (Apr. 24, 1997) 33(9):794-795.

Toliver et al, "Routing of 100 Gb/s Words in a Packet-Switched Optical Networking Demonstration (POND) Node" *Journal of Lightwave Technology* (Dec. 1998) 16(12):2169-2180.

Hill et al, "All-Optical Flip-Flop Based on Coupled Laser Diodes" *IEEE Journal of Quantum Electronics* (Mar. 2001) 37(3):405-413.

Hill et al, "1×2 All Optical Packet Switch" Proc 27th Eur. Conf. on Opt. Comm., (ECOC 2001-Amsterdam, Sep. 30-Oct. 4, 2001) pp. 546-547.

Liu et al, "All-optical Switching of Packets for All-optical Buffering Purposes" Proc 27th Eur. Conf. on Opt. Comm., (ECOC 2001-Amsterdam, Sep. 30-Oct. 4, 2001) pp. 310-311.

Langenhorst et al, "Fiber Loop Optical Buffer" *Journal of Lightwave Technology* (Mar. 1996) 14(3):324-335.

Hunter et al, "Buffering in Optical Packet Switches" *Journal of Lightwave Technology* (Dec. 1998) 16(12):2081-2094.

Hall et al, "100-Gbit/s bitwise logic" *Optics Letters* (Aug. 15, 1998) 23(16):1271-1273.

Wang et al, "All-Fiber Logical Devices Based on the Nonlinear Directional Coupler" *IEEE Photonics Tech Letters* (Jan. 1999) 11(1):72-74.

K. Stubkjaer, "Semiconductor Optical Amplifier-Based All-Optical Gates for High-Speed Optical Processing" *IEEE J. on Selected Topics in Quantum Electr.* (Nov./Dec. 2000) 6(6):1428-1435.

Oie et al, "Survey of Switching Techniques in High-Speed Networks and Their Performance" Proc IEEE INFOCOM 90, pp. 1242-1251 (Jun. 3-7, 1990).

Henrion et al, "A Multipath Self-Routing Switch" *IEEE Communications Magazine* (Apr. 1993) pp. 46-52.

Monacos et al, "All-Optical WDM Packet Networks" *Journal of Lightwave Technology* (Jun. 1996) 14(6):1356-1370.

Yuan et al, "A Novel Self-Routing Address Scheme for All-Optical Packet-Switched Networks With Arbitrary Topologies" *Journal of Lightwave Technology* (Feb. 2003) 21(2): 329-339.

Li et al, "Deflection routing in slotted self-routing networks with arbitrary topology" PROC IEEE ICC (Apr. 28-May 2, 2002) 2781-2785.

Li et al, "Deflection Routing in Slotted Self-Routing Networks With Arbitrary Topology" *IEEE J on Selected Areas in Communications* (Nov. 2004) 22(9):1812-1822.

Li et al, "Multi-casting in deflection-routed all-optical packet-switched networks" Proc GLOBECOM (Nov. 17-21, 2002) 3:2842-2846.

Chan et al, "All-optical header processing using an injection-locked Fabry-Perot laser diode" Ninth Optoelectronics and Communications Conf (Jul. 2004) 608-609.

Chan et al, "All-Optical Header Processing Using an Injection-Locked Fabry-Perot laser diode" *Microwave and Optical Tech Letters* (Feb. 20, 2005) 44(4): 342-345.

Chan et al, "All-Optical Bit-Error Monitoring System Using Cascaded Inverted Wavelength Converter and Optical NOR Gate" *IEEE Photo Tech Ltrs* (Apr. 2003) 15(4):593-595.

Wai et al, "All-optical header processing using control signals generated by directmodulation of a DFB laser" *Optics Comm 242* (Dec. 2004) 155-161.

Chan et al, "Simultaneous Repolarization of Two 10-Gb/s Polarization-Scrambled Wavelength Channels Using a Mutual-Injection-Locked Laser Diode" *IEEE Photo Tech Ltrs* (Dec. 2002) 14(12):1740-1742.

Chan et al, "Demonstration of an all-optical switch by use of a multiwavelength mutual injection-locked laser diode" *Optics Letters* (May 15, 2003) 28(10): 837-839.

Wai et al, "1×N All-optical packet switch at 10Gb/s" Conference on Lasers and Electro-Optics CLEO'2004 (May 16-21, 2004) pp. 1-2.

Wai et al, "Intelligent All-Optical Add-Drop Node for packet switched networks using two-stage injection-locked laser diodes" Proc ECOC '2004 (Sep. 5-9, 2004) vol. 2, pp. 154-155.

Dorren et al, "Optical Packet Switching and Buffering by UsingAll-Optical Signal Processing Methods" *Journal of Lightwave Technology* (Jan. 2003) 21(1):2-12.

Chan et al, "Demonstration of All-Optical Packet Demultiplexing Using A Multi-Wavelength Mutual Injection-Locked Laser Diode" Friday Morning/OFC 2003 (Mar. 23-28, 2003) vol. 2, pp. 671-673.

Chan et al, "Real-Time OC-192 All-Optical Bit-Error Monitoring System Using Inverted Wavelength Converter and Optical NOR Gate" Monday Afternoon/OFC 2003 (Mar. 23-28, 2003) vol. 1, pp. 119-120.

Kitayama et al, "10Gbit/s Packet-Selective Photonic Label-Based ADM Experiment" Proc 27th Eur Conf on Opt Comm (Sep. 30-Oct. 4, 2001) pp. 548-549.

Tsushima et al, "Demonstration of an Optical Packet Add/Drop with Wavelength-Coded Header" *IEEE Photonics Tech Letters*, (Feb. 1995) 7(2):212-214.

Hill et al, "1×2 optical packet switch using all-optical header processing" *Electronics Letters* (Jun. 7, 2001) 37(12):774-775.

Yoo et al, "Rapidly Switching All-Optical Packet Routing System With Optical-Label Swapping Incorporating Tunable Wavelength Conversion and a Uniform-Loss Cyclic Frequency A WGR" IEEE Photo Tech, 14(8):1211-1213, Aug. 2002.

Shrikhande et al, "HORNET: A Packet-Over-WDM Multiple Access Metropolitan Area Ring Network" *IEEE J on Selected Areas in Comm* (Oct. 2000) 18(10):2004-2016.

Danielsen et al, "Analysis of a WDM Packet Switch with Improved PerformanceUnder Bursty Trafic Conditions Due to Tuneable Wavelength Converters" *Journal of Lightwave Technology* (May 1998) 16(5):729-735.

Guillemot et al, "Transparent Optical Packet Switching: The European ACTS KEOPS Project Approach" *Journal of Lightwave Technology* (Dec. 1998) 16(12):2117-2134.

Danielsen et al, "WDM Packet Switch Architectures and Analysis of the Influence of Tuneable Wavelength Converts on the Performance" *Journal of Lightwave Technology* (Feb. 1997) 15(2):219-227.

Schubert et al, "Comparison of Interferometric All-Optical Switches for Demultiplexing Applications in High-Speed OTDM Systems" *Journal of Lightwave Technology* (Apr. 2002) 20(4):618-624.

Lim et al, "Polarization-Independent Optical Demultiplexing by Conventional Nonlinear Optical Loop Mirror in a Polarization-Diversity Loop Configuration" *IEEE Photonics Tech Letters* (Dec. 2000) 12(12):1704-1706.

Wai et al, "All-optical packet switching with all-optical header processing using Fabry-Perot laser diodes" (Nov. 8-11, 2004) pp. 1-14.

\* cited by examiner

ALL-OPTICAL HEADER PROCESSING AND PACKET SWITCHING

BACKGROUND

1. Field of the Invention

The present invention relates generally to optical telecommunication, and particularly to all-optical header processing and packet switching.

2. Background of the Invention

With the increasing popularity of the World Wide Web, the Internet protocol which is by nature a packet-switching technology has become the de facto data transmission standard. However, current optical networks are still based on circuit-switching technology and therefore may not be suitable for handling heavy data traffic. Processing and routing of packet-formatted signals optically are hampered by the lack of practical optical buffers and the limited capability of available optical logic gates.

In the conventional design, a typical packet switch generally includes a header processing unit (HPU) and a packet routing unit (PRU). The HPU processes the header of an incoming packet, determines which output port the input packet should be sent, and set the PRU accordingly. During the packet transmission, either physical or logical, a data path is then provided by the PRU between the related input and output ports. Most of the current optical packet switches are in fact hybrid optical packet switches, i.e., while the packet remains in the optical domain, a copy of the packet header is converted into electrical signals for processing in the HPU. The decision of the HPU is then used to set the PRU to route the packet.

OBJECT OF THE INVENTION

Therefore, it is an object of the present invention to provide an all-optical switching of an optical packet, or at least provide the public with a useful choice.

It is another object of the present invention to provide all-optical header processing, or at least provide the public with a useful choice.

It is a further object of the present invention to provide an all-optical add/drop node, or at least provide the public with a useful choice.

SUMMARY OF THE INVENTION

According to an aspect of the present invention, a process for all-optically switching an incoming optical signal having at least a data packet is provided. The data packet including at least an address bit in its header, and the process includes
receiving the data packet;
processing the header optically;
storing the decision made during the processing of the header; and
switching the whole incoming data packet dependent upon the decision.

According to a second aspect of the present invention, an optical signal switch, which receives an incoming optical signal, is provided. The incoming optical signal includes at least a data packet having at least an address bit in its header, and the switch includes:
an input optical control signal source for generating an input optical control signal including at least a trailer of a first optical intensity and at-lease a trigger of a second optical intensity;
a first laser device, into which both the incoming data signal and the input control signal are injected, and which outputs an output control signal and an output data signal,
wherein the first laser device includes at least locked and unlocked states at both $\lambda_c$ and $\lambda_d$ respectively, and wherein the first laser device selects between the locked and unlocked states at the wavelength of $\lambda_c$, dependent upon a correlation between the trigger and the address bit such that the switch is capable of selectively transmitting the incoming data packet.

According to a third aspect of the present invention, an optical header processor for processing a header of an incoming a data packet is provided. The data packet has at least an address bit in its header, and the header processor includes:
an input optical control signal source for generating an input optical control signal including at least a trailer of a first optical intensity and at least a trigger of a second optical intensity;
a first laser device, into which both the incoming data signal and the input control signal are injected, and which outputs at least an output control signal;
wherein the output control signal of the first laser device is selectively switched on or off for a period at least as long as the incoming data packet dependent upon a correlation between the trigger and the address bit.

According to a further aspect of the present invention, an optical add/drop node for downloading an incoming data packet from an optical signal to a local network and for uploading a local data packet onto the optical signal includes
an optical header processor described thereabove, which receives the incoming data packet and outputs the output control signal;
a first, a second and a third individual optical signal switch controlled by the output control signal of the optical header processor, wherein the first and second switches receives the optical signal with the incoming data packet, wherein the third switch receives the local data packet, and wherein as controlled by the output control signal, the first switch selectively suppresses the incoming data packet in its output, and both the second and third switch selectively transmit the incoming data packet or the local data packet, which they respectively receive.

Other aspects and advantages of the invention will become apparent from the following detailed description, taken in conjunction with the accompanying drawings, which description illustrates by way of example the principles of the invention.

DETAILED DESCRIPTION

Figure 1:
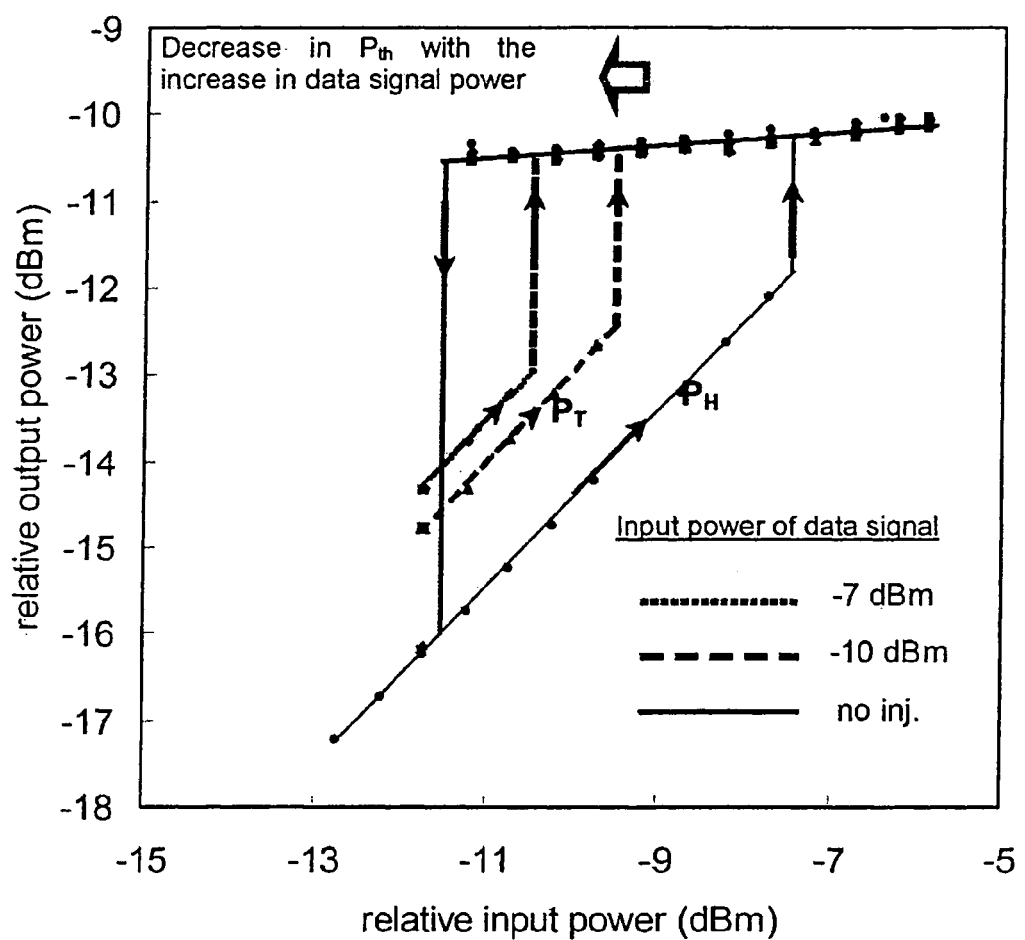
FIG. 1 illustrates measured hysteresis traces for the two-beam injection-locking in a Fabry-Perot laser diode, which can be used in the present invention.

It is observed that the presence of a signal at a wavelength $\lambda_d$ of a Fabry-Perot laser diode (FP-LD) can lower the injection locking threshold at another wavelength $\lambda_c$. The generation of a packet long output control signal from interaction at a single bit is based on the bistable nature of injection locking in the FP-LD, i.e., it takes less power to maintain injection-locking than to initiate one. FIG. 1 shows the input-output power characteristic of a continuous wave (CW) signal injected into an FP-LD under one-mode and two-mode injection. The CW signal is generated from a tunable laser at wavelength 1547.02 nm with +0.1 nm wavelength detune from one of the free-running longitudinal modes of a commercially available FP-LD biased at $1.3I_{th}$ where $I_{th}$ is the threshold current. The solid lines show the power hysteresis of single-mode injection locking. The power required to maintain injection-locking of a FP-LD can be less than the power required to initiate injection-locking from its unlocked state. The dashed line in FIG. 1 shows the measured hysteresis of the same injected signal when a second signal at 1554.60 nm, which is at zero detune from another FP-LD mode, is injected into the FP-LD at a power of −10 dBm. The injection-locking threshold of the first injected signal decreases in the presence of the second signal.

Figure 2:
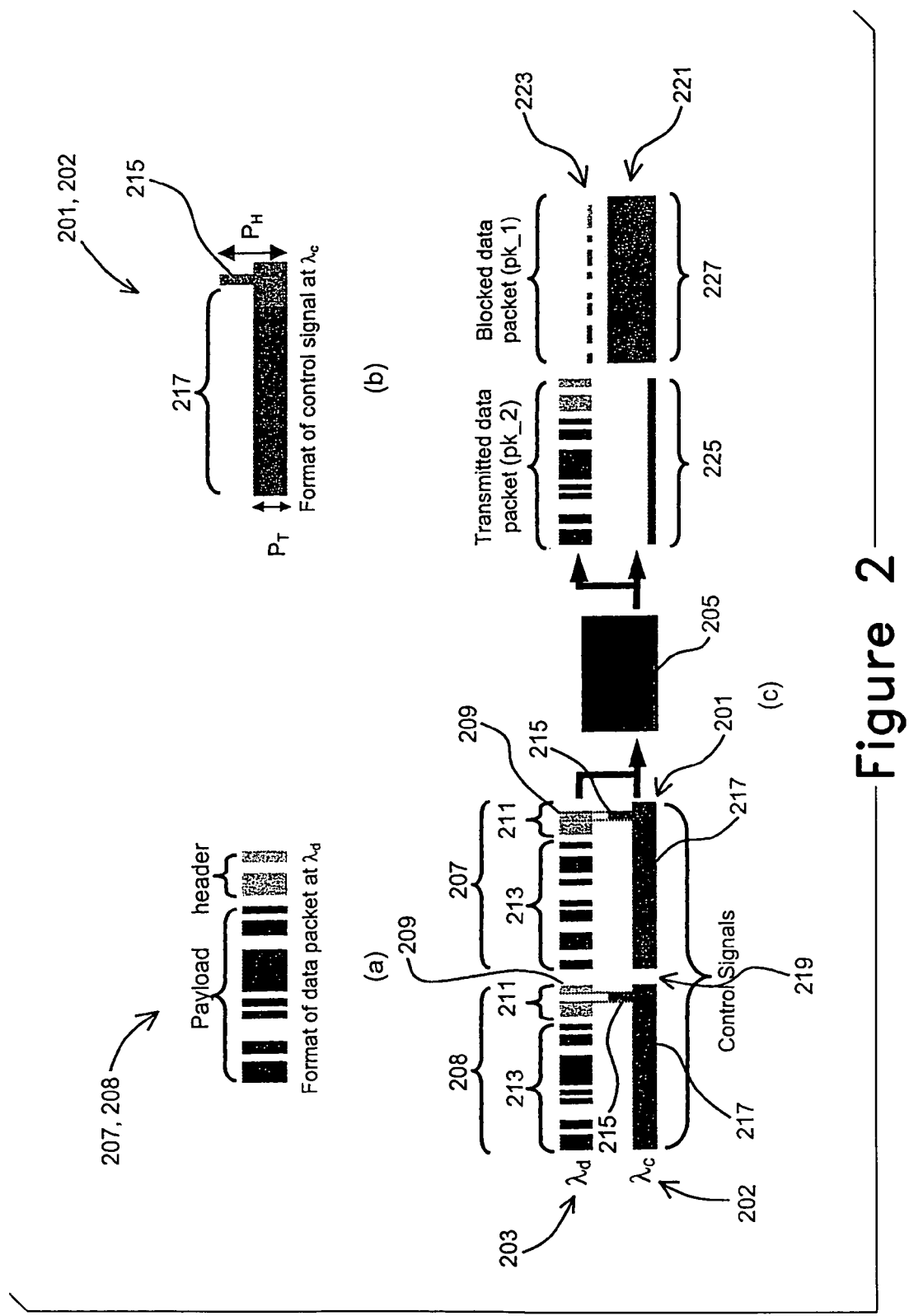
FIG. 2a illustrates the format of an input data signal suitable for being used in an exemplary header processor of the invention.
FIG. 2b illustrates the format of an input control signal suitable for being used in an exemplary header processor of the invention.
FIG. 2c illustrates the processing by the exemplary header processor of the invention.

FIGS. 2a-c illustrate an exemplary scheme for all-optical header processing and output control signal generation using a single FP-LD 205. The exemplary scheme requires an input control signal 201, 202 at wavelength $\lambda_c$ that has a trigger 215 at power $P_H$ and a long trailer at power $P_T$ where $P_H > P_T$ (FIG. 2b). The guard band 219 between the input control signals 201 is at zero power. Ideally the width of the trigger 215 equals to the bit period of the data packet payload 213 (see FIG. 2c). The total length of the input control signals 201, 202 equals to that of a data packet 207 of an incoming optical signal 203 shown in FIG. 2c. The incoming signal 203 shown in FIG. 2c has two data packets 207, 208, each having a header or address 211 and a payload 213. In the exemplary embodiment, each header 211 has a single "1" bit 209 for identifying the address of destination of the corresponding data packet 207. For example, in the exemplary embodiment, there are two data packets, and the header can be in the form of 01 and 10 respectively.

Furthermore, the wavelengths of the input control signal 201, 202 and incoming data packets 207, 208, $\lambda_c$ and $\lambda_d$, are located at the longer wavelength side of two different longitudinal modes of the FP-LD 205. The power of the input control signal trigger $P_H$ is chosen to be $P_{th2} \leq P_H < P_{th1}$ where $P_{th1}$ and $P_{th2}$ are the injection-locking thresholds of the FP-LD 205 at wavelength $\lambda_c$ in the absence and presence of the data packets 207, 208 at $\lambda_d$ respectively. In other words, $P_{th1}$ and $P_{th2}$ are respectively the single-mode and two-mode injection locking thresholds of the FP-LD 205 at $\lambda_c$. Thus the input control signal trigger will injection-lock the FP-LD 205 and experience power gain if it matches a '1' in the data packet 207, 208, but the input control signal trigger 215 cannot initiate injection locking alone, i.e., if it matches with a '0' in the data packet 207, 208. The power of the input control signal trailer $P_T$ is chosen to be $P_{th3} \leq P_T < P_{th2}$, where $P_{th3}$ is the power at which the FP-LD 205 returns to the unlocked state from the locked state, such that once the input control signal trigger 215 initiates injection-locking in the FP-LD 205 the trailer 217 can sustain the injection-locking state at wavelength $\lambda_c$ till the end of the input control signal 201 because of the bi-stable property of injection-locking. The input control signal trailer 217, however, cannot initiate injection locking even in the presence of the '1' bits in the data packet 207, 208. From FIG. 1, $P_{th3}$ at wavelength $\lambda_c$ is the same both in the presence or absence of the signal at wavelength $\lambda_d$. FIG. 2c shows schematically the output control signal 221 at the output of the FP-LD 205 without (see reference number 225) and with (see reference number 227) injection locking. It is understood that the FP-LD 205 also outputs an output data signal 223 at the wavelength $\lambda_d$.

FIG. 2c shows the signal processing schematically. The FP-LD 205 is set in the locked state at wavelength $\lambda_d$ in the beginning. For data packet pk_1 207, the input control signal trigger 215 of the input control signal 201 matches with the '1' bit 209 in the header 211 in the time domain. Injection locking at wavelength $\lambda_c$ is initiated and sustained through the duration of the input control signal 201. In other words, FP-LD is switched from the locked state to the unlocked state at wavelength $\lambda_d$, and from the unlocked state to the locked state at wavelength $\lambda_c$. The output control signal 221 of the FP-LD 205 at $\lambda_c$ is therefore high (ON state), and the output data signal 223 may be relatively significantly suppressed as could be understood in the art.

During the guard band period 219 of the input control signal, the FP-LD 205 returns back to the unlocked state at wavelength $\lambda_c$ in the exemplary embodiment due to the zero power of the input control signal during this period.

Afterwards, data packet pk_2 208 arrives, and the control signal trigger 215 of the input control signal 202 does not match with the '1' bit 209 in the header 211. Injection locking at wavelength $\lambda_c$ is not initiated either at the control signal trigger 215 or at other part of the input control signal 202. The output control signal of the FP-LD 205 at wavelength $\lambda_c$ is low (OFF state), while the FP-LD 205 may transmit data packet pk_2 208 in its output data signal 223 as shown in FIG. 2c since the FP-LD 205 is in the locked state at wavelength $\lambda_d$ during this period in the exemplary embodiment.

Figure 3:
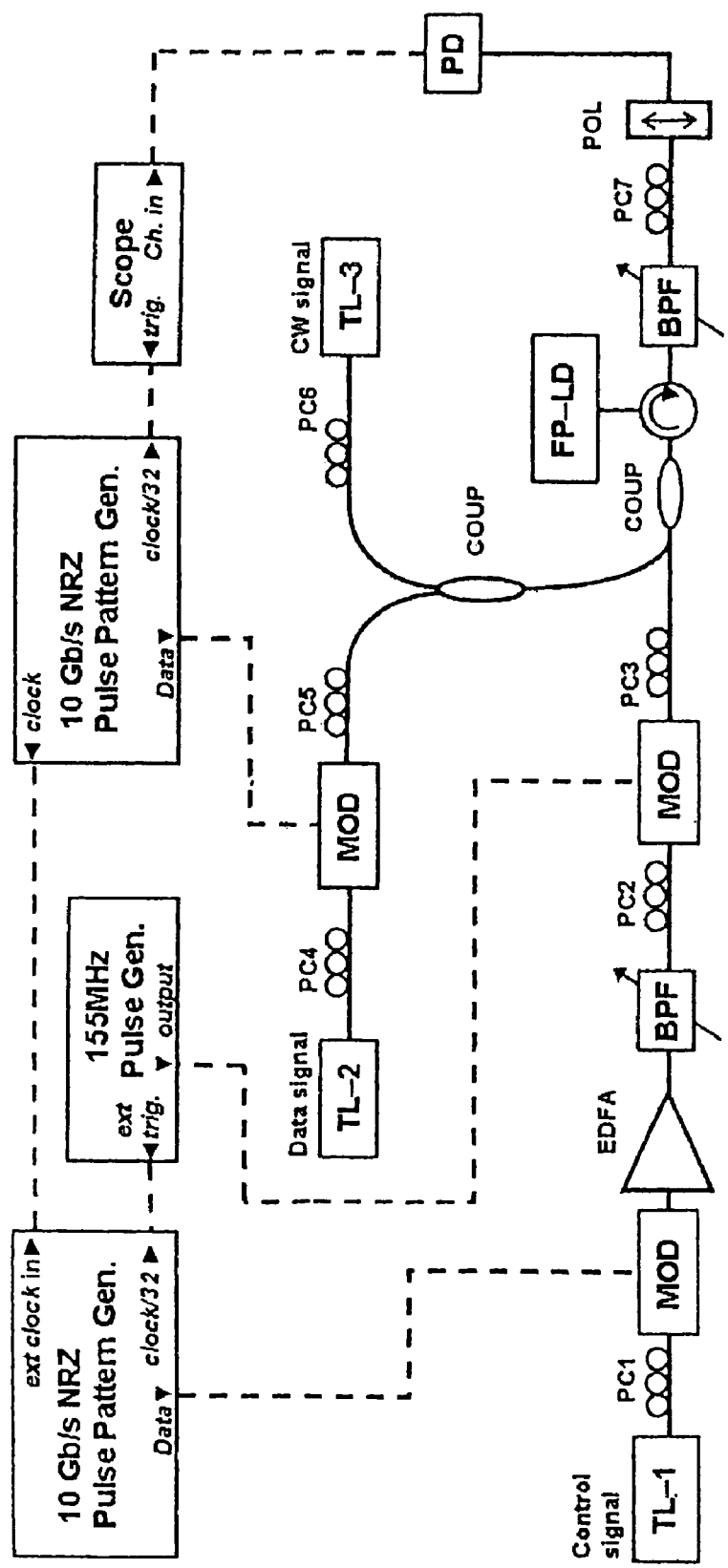
FIG. 3 illustrates the exemplary header processor according to an embodiment of the invention.

FIG. 3 shows an exemplary all-optical header-processor. A CW signal at 1537.41 nm with power −11.98 dBm (measured before injection into the FP-LD) from a tunable laser TL-3 is injected into the main mode of the FP-LD to suppress the output of FP-LD during the guard band period. The 10 Gb/s non-return-to-zero (NRZ) data packet at 1534.65 nm was generated by externally modulating a tunable laser TL-2 with power −20.35 dBm (measured before injection into the FP-LD). The input control signal at 1541.41 nm was produced by externally modulating another tunable laser TL-1 using two Mach-Zehnder Modulators with different extinction ratios as could be understood in the art. The power for the control packet measured at the output of the FP-LD is −1.83 dBm before injection into the FP-LD. The pulse width of the trigger in the control packet is 200 ps, which determined the header processing rate as 5 Gb/s. The duration of the input control signal is 5.5 ns and the guard period is 0.95 ns, thus the repetition rate is 155 MHz. The wavelength detunes for the input control signals, the input data packets and the CW signal are +0.24 nm, +0.08 nm and +0.06 nm with three different FP-LD modes respectively. The bias current of the FP-LD is $1.3 I_{th}$.

Figure 4:
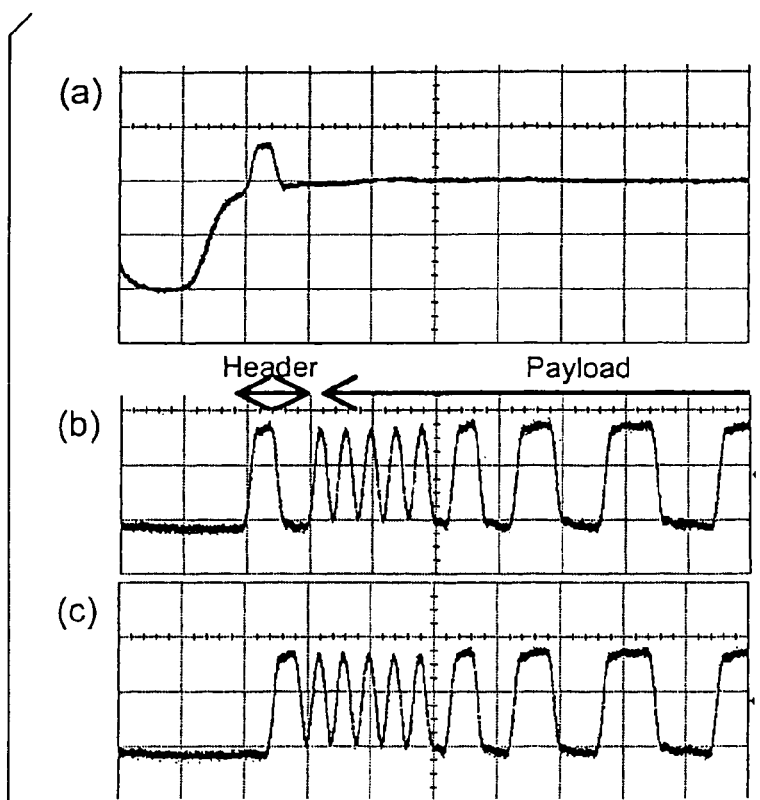
FIGS. 4a-c respectively illustrate an input control signal, a first input data packet in which its "1" address bit temporally overlaps with the trigger of the control signal, and a second input data packet in which its "1" address bit does not overlap with the trigger of the control signal.
Figure 5:
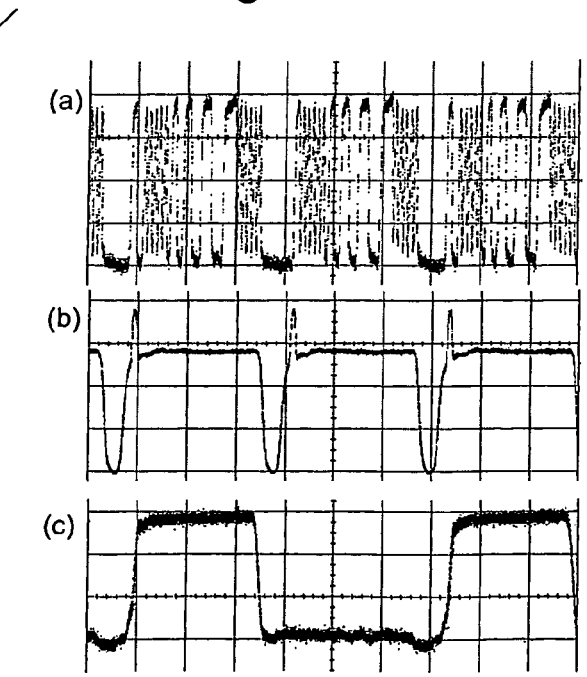
FIGS. 5a-c respectively illustrate synchronized temporal profiles of the input data packets, the input control signal and the output control signal.

FIG. 4a shows the temporal profile of the input control signal. FIGS. 4b and 4c shows the two types of data packets used: pk_1 and pk_2 which have a 2-bit address header with bit patterns of '10' and '01' respectively. The bit period is 200 ps, thus the header rate is 5 Gb/s. The input data-packets and the input control signals are synchronized such that the headers of the data packets are aligned with the input control signal trigger. FIGS. 5a, 5b and 5c show the input 10 Gb/s NRZ data packets, the synchronized input control signal, and the switched output of the control signals respectively. The output of the control signal is high (ON) and low (OFF) if the input control signal trigger matches with a '1' or '0' bit respectively in the data packet address header. Thus a packet long output control signal is generated by the action at a single bit location in the address header. The switched output control signal can then be sent to a packet routing unit (not shown) to forward the data packets as generally understood in the art. For example, the output control signal can be sent to control a simple all-optical on/off switch such as a semiconductor optical amplifier (SOA), which also receives the data packets, to selectively transmit or suppress the data packets.

Figure 6:
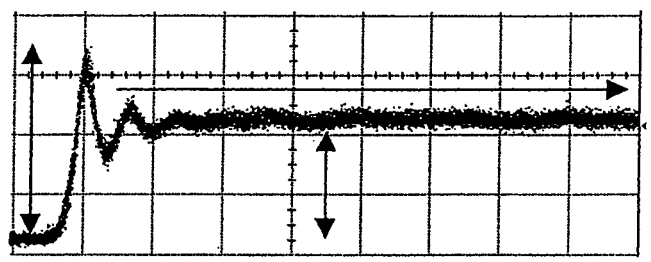
FIG. 6 illustrates a temporal profile of an input control signal generated by direct modulation of a distributed feedback laser diode.

Alternatively, the input control signal can be generated by direct modulation of a distributed feedback (DFB) semiconductor laser diode with square electrical pulses (not shown) as generally understood in the art. The peaks of the natural relaxation oscillations initiated by the modulation can function as the trigger while the steady state output of the laser serves as the trailer of the required control signals. FIG. 6 shows the two-level input control signal generated by direct modulation of a DFB laser. The parameters of the modulation needs to be chosen to satisfy the criteria described in with references to FIGS. 2-5, i.e., i) only the first peak of the relaxation oscillation will initiate injection locking at wavelength $\lambda_c$ in the presence of the data signal, and ii) the rest of the relaxation oscillation and the steady state output itself cannot initiate injection locking even in the presence of the data signal at wavelength $\lambda_d$ but can sustain injection locking once it is started at the trigger portion of the header region.

Other types of laser diodes may be also suitable for generating the input control signal, for example, a vertical cavity surface emitting laser (VCSEL) or a Fabry-Perot laser diode.

Figure 7:
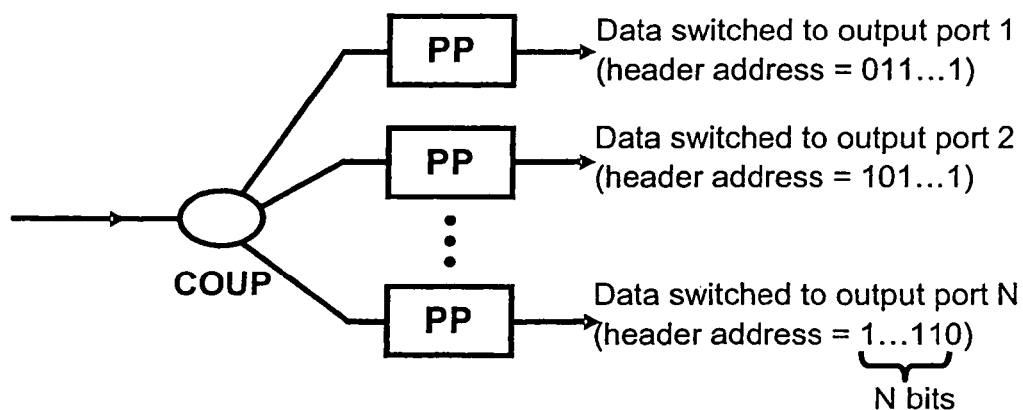
FIG. 7 illustrates a 1×N all-optical packet switch.

FIG. 7 shows a schematic of an exemplary 1×N all-optical packet switch. An incoming packet is first split into N parts using a 1×N coupler into the N output ports of the 1×N switch. The packet processor (PP) at each output port transmits a packet only if the packet header address matches with the address of the output port and blocks the packet otherwise. For an incoming packet, only one of the N PP's will transmit while the other (N−1) PP's will block the data packet. The packet forwarding function is thus realized. Because of the splitting of the signals by the coupler, in practice the data packets needs to be amplified after splitting. The size of the proposed all-optical packet switch is therefore limited by the signal to noise ratio of the amplified data packets after the splitting.

In this demonstration of one output port of the 1×N optical switch, a data packet indicates its intended output port at a node by setting the corresponding address bit in the header to '0' and the rest of the address bits to '1's. The input control signal header contains the complement of the address, i.e., the bit in the control signal header corresponding to the output port is set to '1', all other bits in the control signal header are set to '0'. With this arrangement, when the address the data packet matches with that of the input control signal, the FP-LD will be injection-locked at wavelength $\lambda_d$ and will therefore transmit the data packet. Otherwise, the FP-LD will be injection-locked at wavelength $\lambda_c$ and blocks the data packet. For simplicity, it is assumed in the following that the header of a data packet contains only the address of an output port of a single node. In the embodiment, four different data packets are encoded with different header bits which indicate four different output ports. The data packet header is therefore only 4 bits long. The bit period at the header is 200 ps long which means the header rate is 5 Gb/s. The packet headers of the four different packets are arranged in the order of '0111', '1011', '1101', and '1110' for pk_1 to pk_4 respectively. Thus the data packets are arranged such that they are intended for output port 1 to 4 in consecutive order. The data packet payload is 48 bits long. The bit period at the payload is 100 ps long corresponding to a payload rate of 10 Gb/s. The guard period is 800 ps long. The payload length is chosen for convenience and in principle can be hundreds of thousands of bits long. The guard period is limited by the rise-time and fall-time of the control signal and can be further reduced. The header of the control signal is '0100' which corresponds to the complement of the address of output port 2 of the 1×4 switch. When the header of the data packet matches with that of the input control signal, for example, pk_2 only, the FP-LD transmits the data packets and otherwise blocks the packets. However, because of the finite response time of the FP-LD, part of the address headers of the blocked data packets, i.e., pk_1, pk_3, and pk_4, is able to pass through the FP-LD before injection locking by the control signal header at wavelength $\lambda_c$ can take place. The switching ratio is about 7.5 dB measured in the time domain with zero level at around −20 dBm.

Figure 8:
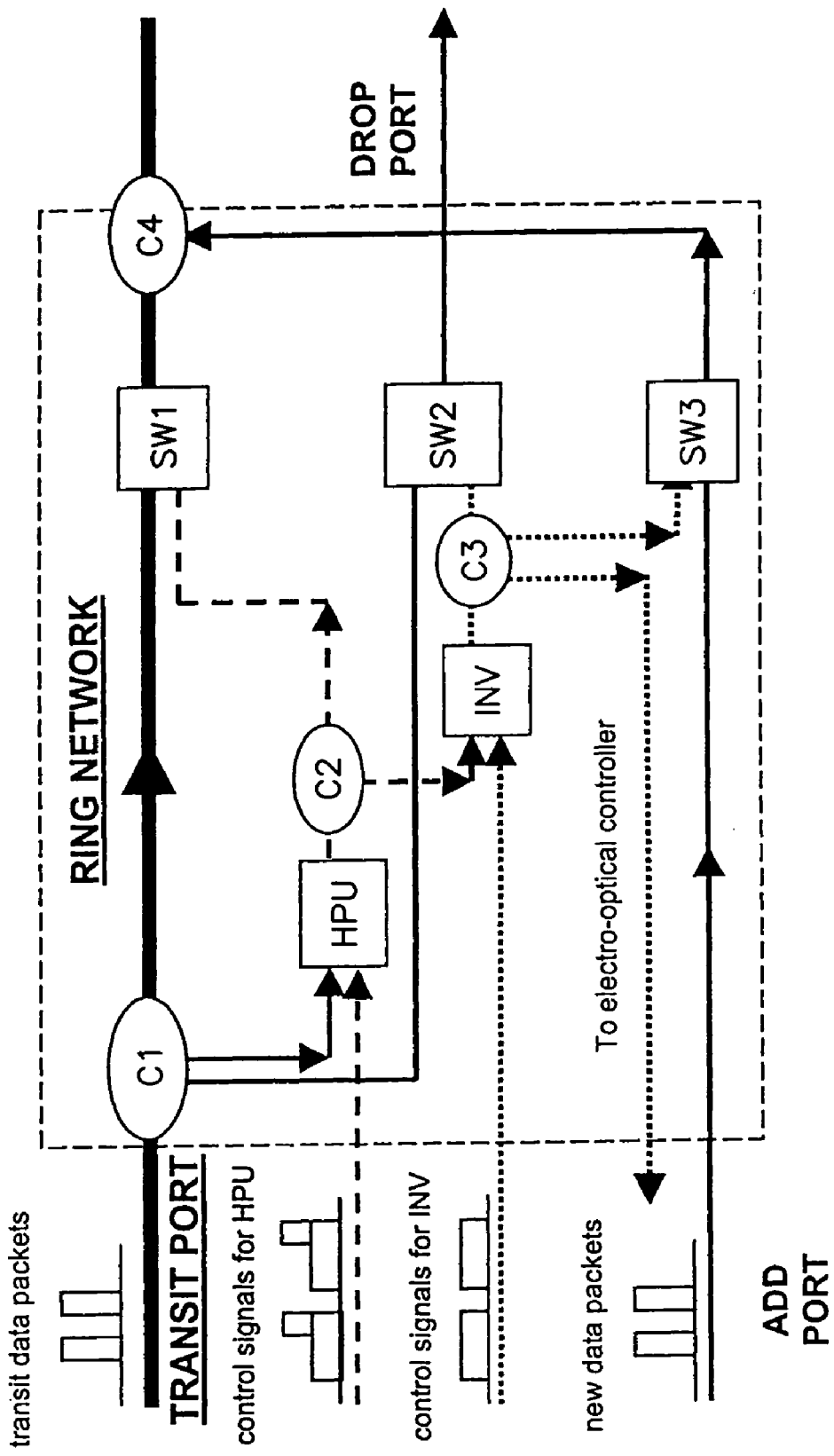
FIG. 8 illustrates an all-optical add/drop node.
Figure 9:
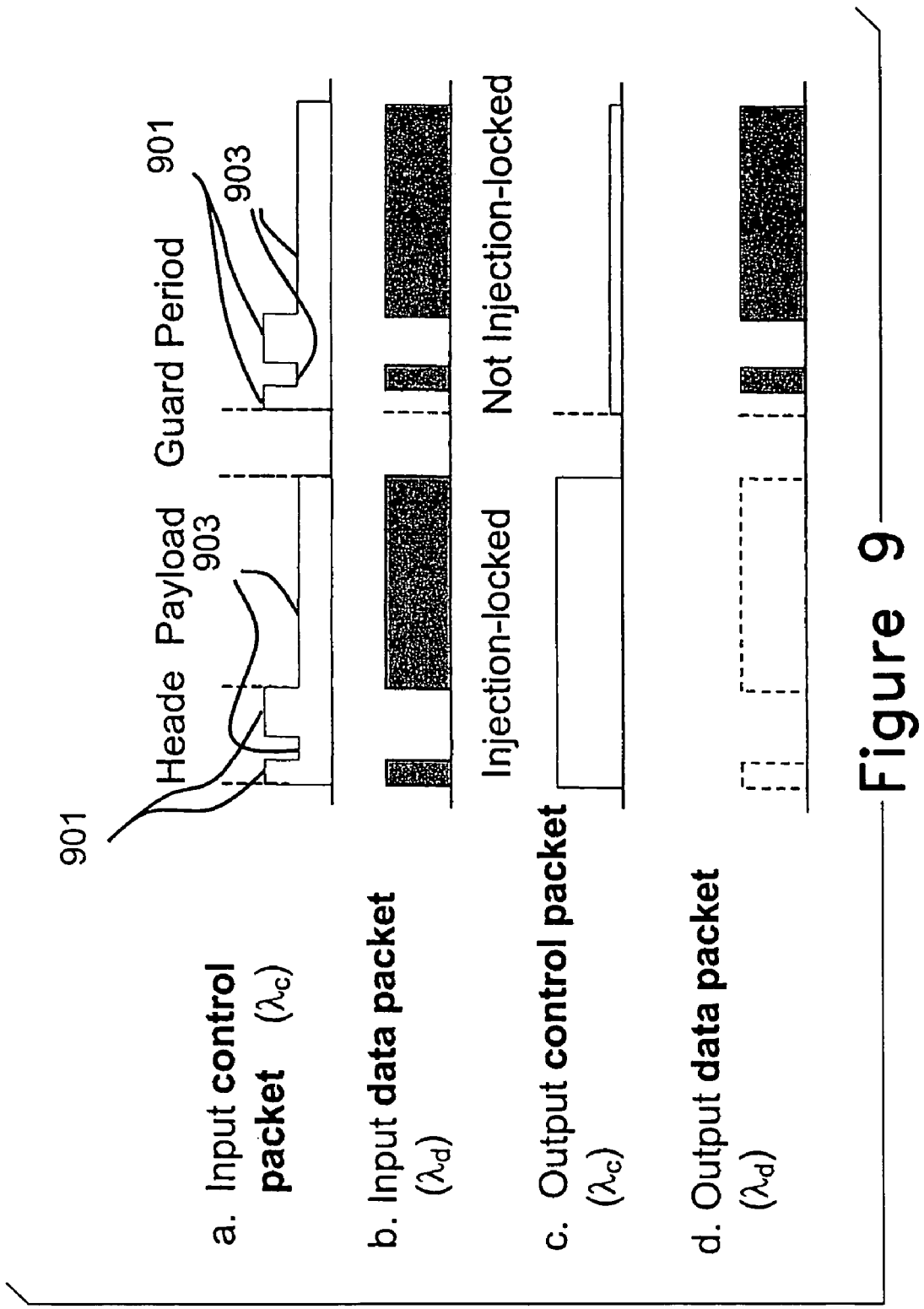
FIGS. 9a-d illustrates another synchronized temporal profiles of the input control signal, the input data packets, the output control signal, and the output data packets.

FIG. 8 shows an exemplary all-optical packet add/drop node for an all-optical packet-switched ring network. For better utilization of the bandwidth, it is assumed in this application that the network is slotted, i.e. all the packets are synchronized. A ring topology is chosen for simplicity.

The functions of the add/drop node are (i) to add a packet to the network (denoted by thick solid line in FIG. 8) if the incoming slot is empty or the incoming transit packet is destined for the node, and (ii) drop a packet from the ring into the local output port (denoted drop port in FIG. 8) if the address of the packet matches that of the node.

The node is constructed with five all-optical logic devices. HPU serves as an all-optical header processor. INV functions as a signal inverter, i.e. the output of INV will be high if the input is low and vice versa. SW1, SW2, and SW3 are simple all-optical on/off switches. SW1 controls whether a transit packet in the ring is allowed to continue on in the ring, SW2 determines whether a packet in the ring can be sent to the local drop port, and SW3 determines whether a packet from the add port of the node can be placed in the ring.

The exemplary node operates as follows. If the address header of a transit data packet in the ring entering the node through the transit port matches with the address of the node carried by the control signal input to HPU, HPU will generate a control signal that will set SW1 to block the packet while setting SW2 and SW3 to transmit. As a result, the data packet is removed from the ring and passed to the drop port. Thus the packet drop function of the node is achieved. At the same time SW3 allows a packet from the local add port, if any, to be placed in the ring to fill the vacated time slot. If the address header of the transit data packet in the ring does not match with that of the node, SW1 is set to transmit while SW2 and SW3 are set to block. In this case, the packet in the ring is transmitted to the next node while no packet is allowed to be added to the ring.

TABLE 1

Summary of the logic operation of the exemplary all-optical add/drop node

| Transit packet | Input Packet | HPU | INV | SW1 (transit port) | SW2 (drop port) | SW3 (add port) |
|---|---|---|---|---|---|---|
| Empty packets | Yes | ON | OFF | Block | Transmit | Transmit |
| Empty packets | Empty | ON | OFF | Block | Transmit | Transmit |
| Address match | Yes | ON | OFF | Block | Transmit | Transmit |
| Address match | Empty | ON | OFF | Block | Transmit | Transmit |
| Address not-match | Yes | OFF | ON | Transmit | Block | Block |
| Address not-match | Empty | OFF | ON | Transmit | Block | Block |

In order to avoid differentiating an empty time slot from an occupied time slot, the address of empty packets is defined such that they are accepted by all the nodes in the network. In addition, a node will continue to transmit empty packets even if it has nothing to send. As a result, each node continuously accepts empty packets from the node upstream and sends empty packets to the node downstream even if there are no user data packets in the network. By this construction, the task of separating empty slots from those containing user information sent from other nodes is pushed to the local node, thus relieving the optical signal processing requirement of the proposed add/drop node. The operation of the proposed all-optical add/drop node is summarized in Table 1.

Various alternatives can be made to the embodiment(s) described above. For example, other types of laser devices can be used to replace the Fabry-Perot laser diode. Preferably, such laser devices is also a multimode laser and can work in bistable states. When such laser device works as a switch or header processor, two or three external optical signals at different wavelengths are injected into the laser device. The laser device can be injection-locked by one of the externally injected optical signals, and the processing is achieved when the wavelength at which the laser device is injection locked is changed from one wavelength to another or when the laser diode changes from one of the locked and unlocked states at a particular wavelength to the other, preferably at the wavelength of the input control signal. It could be understood in the art that the processing can also be achieved when the laser diode changes from one of the locked and unlocked states at the wavelength of the input data signal. In the scenario, when the laser diode is in the locked state at the wavelength of the input data signal, the intensity of output data signal may experience a significant gain; whereas when the laser diode is in the unlocked state at the wavelength of the input data signal, the output data signal may be suppressed to a relatively significant extent.

In addition, the input control signal may have various formats, and FIGS. 9a-d illustrates another example, in which the trigger 901 and the trailer 903 are interlaced. Specifically, part of the trailer 903 is inserted in the trigger 901. Also, it can be understood in the art that width of the trigger can be shorter than the bit period of the input data packet so long as it is sufficient to trigger the FP-LD to change from the unlocked state to the locked state at $\lambda_c$.

Furthermore, the powers and wavelength detunes of both the control signal and the data signal can be chosen to determine at which situation—whether the address bit of the data packet matches or does not match with the trigger of the control signal—the laser device should transmit or block the data packet. For example, the address bit can be implemented by the absence of optical intensity in the corresponding bit window. In such a scenario, the output at $\lambda_c$ is switched off if the trigger matches the address bit.

What is claimed is:

1. A process for optically switching an incoming optical signal having a header address bit in a data packet of the incoming optical signal, the process comprising
    (a) injecting the data packet and an input optical control signal into a laser device, said optical control signal having a first wavelength $\lambda c$ and the data packet having a second wavelength $\lambda d$ and said laser device having both locked and unlocked states at the first wavelength $\lambda c$ and the second wavelength $\lambda d$;
    (b) optically processing the header of the data packet by setting the laser device at the locked state or the unlocked state at the wavelength $\lambda c$ and by maintaining the state of the laser device for processing of the packet;
    (c) said state of the laser device being based upon the combination of a trigger of a first optical intensity in the control signal and the address bit of the data packet; and
    (d) said state of the laser device being maintained by a trailer of a second optical intensity of the control signal;
    (e) selectively enabling the transmission of the data packet based upon the state of the laser device.

2. The process of claim 1, wherein the input optical control signal is generated by directly modulating a second laser device.

3. The process of claim 1, wherein a width of the trigger is at least substantially a same as a bit period of an incoming data packet.

4. The process of claim 3, wherein the laser device is a Fabry-Perot laser diode, into which both the incoming data signal and the input control signal are injected, and said Fabry-Perot laser outputting an output control signal and an output data signal.

5. The process of claim 4, wherein the Fabry-Perot laser diode is injection-locked into the locked state at wavelength $\lambda_c$ such that the output control signal of the Fabry-Perot laser diode is switched on for a period at least as long as the incoming data packet, and wherein the process further includes using the output control signal for selective transmission of the incoming data signal.

6. The process of claim 5, wherein the Fabry-Perot laser diode has injection locking thresholds $P_{th1}$ and $P_{th2}$ at $\lambda_c$ in the absence and presence of the data packet at $\lambda_d$ respectively, wherein the power of the trigger $P_H$ is set to be $P_{th2} < P_H < P_{th1}$, and wherein the power of the trailer $P_T$ is set to be $P_T < P_{th2}$.

7. The process of claim 6, wherein power of the trailer $P_T$ is set to be $P_{th3} < P_T$, wherein $P_{th3}$ is the threshold at which the Fabry-Perot laser diode switches from the locked state to the unlocked state at wavelength $\lambda_c$.

8. The process of claim 1, wherein the input control signal and the incoming signal have a first and a second wavelength, $\lambda_c$ and $\lambda_d$, respectively, and wherein the step of selective enabling the transmission includes
    transmitting the whole data packet in the output data signal.

9. The process of claim 1, wherein the input optical control signal is generated by modulating a third laser device through a first and a second modulator optically connected in series.

10. An optical signal switch for receiving an incoming optical data signal having a header address bit in a data packet of the incoming optical signal, the optical signal switch comprising:

an input optical control signal source for generating an input optical control signal at a first wavelength $\lambda_c$, said input optical control signal including a trailer of a first optical intensity and a trigger of a second optical intensity;
a first laser device, for injecting both the input control signal at a first wavelength $\lambda_c$ and the incoming data signal at second wavelength $\lambda_d$,
wherein said first laser device having both locked and unlocked states at wavelength $\lambda_c$ and wavelength $\lambda_d$,
wherein the first laser device is set at the locked or unlocked states at the wavelength $\lambda_c$ upon the combination of the trigger of the control signal and the address bit of the data packet and said state of the laser device is maintained by the trailer of a second optical intensity of the control signal;
said state of the laser device selectively enabling transmission of the incoming data packet and transmission of an output control signal.

11. The switch of claim 10, further comprising a packet routing unit, said packet routing unit receiving the incoming optical signal, wherein the first laser device outputs the output control signal to the packet routing unit so that the packing routing unit selectively transmits the incoming data packet upon the combination of the trigger of the incoming control signal and the address bit of the data packet.

12. The switch of claim 10, wherein the first laser device includes a first Fabry-Perot laser diode.

13. The switch of claim 12, wherein the first Fabry-Perot laser diode has injection locking thresholds $P_{th1}$ and $P_{th2}$ at $\lambda_c$ in the absence and presence of the data packet at $\lambda_d$ respectively, wherein the power of the trigger $P_H$ is set to be $P_{th2}<P_H<P_{th1}$, and wherein the power of the trailer $P_T$ is set to be $P_T<P_{th2}$.

14. The switch of claim 13, wherein $P_T$ is set to be $P_{th3}<P_T$, wherein $P_{th3}$ is the threshold, at which the first Fabry-Perot laser diode switches from the locked state to the unlocked state at wavelength $\lambda_c$.

15. The switch of claim 10, wherein the control signal source includes a second laser device, said second laser device is directly modulated so as to generate the control signal having the trigger and the trailer.

16. The switch of claim 15, wherein the second laser device includes a second laser diode.

17. The switch of claim 16, wherein the control signal source includes
a third laser device for generating an optical signal; and
a modulating device for modulating the optical signal so as to generate the input control signal having the trigger and the trailer.

18. The switch of claim 17, wherein the third laser device includes a third laser diode.

19. The switch of claim 17, wherein the modulating device includes a first modulator and a second modulator optically connected in series.

20. An optical header processor for processing the header address bit of an incoming a data packet, the optical header processor comprising:
an input optical control signal source for generating an input optical control signal, said input optical control signal having a trailer of a first optical intensity and a trigger of a second optical intensity;
a first laser device, for injecting both the input control signal at a first wavelength $\lambda_c$ and the incoming data signal at second wavelength $\lambda_d$, wherein said first laser device has both locked and unlocked states at wavelength $\lambda_c$ and wavelength $\lambda_d$;
wherein the first laser device is set at the locked or unlocked state at the wavelength $\lambda c$ upon the combination of the trigger of the control signal and the address bit of the data packet and said state of the laser device is maintained by the trailer of a second optical intensity of the control signal;
such that said state of the laser device selectively enables transmission of the output control signal of the first laser device for a period at least as long as the incoming data packet.

21. The header processor of claim 20, wherein the first laser device includes a first Fabry-Perot laser diode.

22. The header processor of claim 21, wherein the first Fabry-Perot laser diode has injection locking thresholds $P_{th1}$ and $P_{th2}$ at $\lambda_c$ in the absence and presence of the data packet at $\lambda_d$ respectively, wherein the power of the trigger $P_H$ is set to be $P_{th2}<P_H<P_{th1}$, and wherein the power of the trailer $P_T$ is set to be $P_T<P_{th2}$.

23. The header processor of claim 20, wherein the power of the trailer PT is set to be PT<Pth2.

24. The header processor of claim 23, wherein $P_T$ is set to be $P_{th3}<P_T$, wherein $P_{th3}$ is the threshold, at which the first Fabry-Perot laser diode switches from the locked state to a unlocked state at wavelength $\lambda_c$ such that the output control signal of the first laser device is blocked.

25. The header processor of claim 23, wherein the input control signal source includes a second laser device, which is directly modulated so as to generate the input control signal with the trigger and the trailer.

26. The header processor of claim 25, wherein the second laser device includes a distributed feedback laser diode.

27. The header processor of claim 26, wherein the control signal source includes
a third laser device for generating an optical signal; and
a modulating device for modulating the optical signal so as to generate the control signal with the trigger and the trailer.

28. The header processor of claim 27, wherein the third laser device includes a third laser diode.

29. The header processor of claim 28, wherein the modulating device includes a first modulator and a second modulator optically connected in series.

30. An optical add/drop node for downloading an incoming data packet from an optical signal to a local network and for uploading a local data packet onto the optical signal, comprising
an optical header processor of claim 20, said optical header processor being for receiving the incoming data packet and outputting an output control signal;
first and second optical signal switches controlled by the output control signal of the optical header processor, said switches receiving the optical signal with the incoming data packet;
a third optical signal switch controlled by the output control signal of the optical header processor and receiving the local packet;
wherein the output control signal causes the first switch to selectively suppress output of the incoming data packet, the second switch to selectively transmit the incoming data packet and the third switch to selectively transmit the local data packet.

* * * * *